(12) United States Patent
Boulanger et al.

(10) Patent No.: US 8,449,747 B2
(45) Date of Patent: May 28, 2013

(54) METHOD AND DEVICE FOR SELECTIVE CATION EXTRACTION BY ELECTROCHEMICAL TRANSFER IN SOLUTION AND APPLICATIONS OF SAID METHOD

(75) Inventors: Clotilde Boulanger, Coin les Cuvry (FR); Sakina Seghir, Metz (FR); Nathalie Leclerc, Bionville sur Nied (FR); Sebastien Diliberto, Nancy (FR); Jean-Marie Lecuire, Coin les Cuvry (FR)

(73) Assignees: Universite de Lorraine, Nancy (FR); Centre National de la Recherche Scientifique, Paris (FR)

( * ) Notice: Subject to any disclaimer, the term of this patent is extended or adjusted under 35 U.S.C. 154(b) by 545 days.

(21) Appl. No.: 12/666,372

(22) PCT Filed: Jun. 25, 2008

(86) PCT No.: PCT/FR2008/051149
§ 371 (c)(1),
(2), (4) Date: May 28, 2010

(87) PCT Pub. No.: WO2009/007598
PCT Pub. Date: Jan. 15, 2009

(65) Prior Publication Data
US 2010/0252442 A1    Oct. 7, 2010

(30) Foreign Application Priority Data
Jun. 27, 2007 (FR) ...................................... 07 04599

(51) Int. Cl.
*B01D 61/00* (2006.01)
(52) U.S. Cl.
CPC ...................................... *B01D 61/00* (2013.01)

USPC ........................... 204/630; 205/746; 205/748
(58) Field of Classification Search
USPC ........................... 205/477, 746, 748; 204/630
See application file for complete search history.

(56) References Cited

FOREIGN PATENT DOCUMENTS
DE     10311573 A1    10/2004

OTHER PUBLICATIONS

Xu et al: "Ion exchange membranes: state of their development and perspective" Journal of Membrane Science, Elsevier Scientific Publ. Company. Amsterdam, NL, vol. 263, No. 1-2, Oct. 15, 2005, pp. 1-29.
Garcia-Gabaldon et al: "Effect of porosity on the effective electrical conductivity of different ceramic membranes used as separators in electrochemical reactors" Journal of Membrance Science, Elsevier Scientific Publ.Company. Amsterdam~NL, vol. 280, No. 1-2, Sep. 1, 2006; pp. 536-544.
International Search Report in Corresponding Application PCT/FR2008/051149 dated Nov. 25, 2008.

*Primary Examiner* — Keith Hendricks
*Assistant Examiner* — Salil Jain
(74) *Attorney, Agent, or Firm* — Young & Thompson

(57) ABSTRACT

In order to carry out a selective extraction of cations ($M^{n+}$) by an electrochemical transfer in a solution from a first electrolyte (E1) to a second electrolyte (E2), the method includes using as an electrolyte separation wall a transfer wall (2) made of chalcogenide with molybdenum clusters ($Mo_nX_{n+2}$ or $M_xMo_nX_{n+2}$) and ensuring the cation transfer through the transfer wall by generating a potential difference ($\Delta E$) between the electrode A1 in the first electrolyte (E1) and the electrode C2 in the second electrolyte (E1) or the transfer wall (2) in order to induce an intercalation of the cations in the transfer wall on the side of the first electrolyte, a scattering of the cations therein, and the de-intercalation thereof in the second electrolyte.

20 Claims, 3 Drawing Sheets

METHOD AND DEVICE FOR SELECTIVE CATION EXTRACTION BY ELECTROCHEMICAL TRANSFER IN SOLUTION AND APPLICATIONS OF SAID METHOD

The present invention relates to a method and device for selective cation extraction by electrochemical transfer in solution and various applications of this method for example for separation, recycling, decontamination, direct or indirect valorisation treatments for the products obtained by transfer, demineralisation, concentration, etc.

The invention more precisely relates to an electrolytic-type method ensuring a transfer of ions, more especially cations, via an adapted wall, from a first electrolyte solution containing one or more categories of ions of same charge or different charges to a second electrolytic solution.

Methods of this type are already known using ion exchanger resins or membranes as separation walls.

The separation and concentration methods using synthetic membranes are many and the applications are highly diversified.

The role of an ion exchanger membrane is to act as a barrier, if possible selective, between two solutions. Under the effect of a transfer force, generally generated by an electrical potential gradient, such a membrane enables the passage or the stoppage of certain chemical species between the two media that it separates. The membrane can be homogeneous or heterogeneous, of symmetrical or asymmetrical structure. It can be gaseous, liquid, solid of mineral or organic origin. It can be neutral or carry positive or negative charges. It can be porous or dense.

The basic method during the use of ion exchanger membranes is electrodialysis which corresponds to a transfer of ions through these membranes under the effect of an electric field. The ion exchanger membranes allow the passage by migration of charged species and in a selective manner according to the sign of their charge: cation transfer in the case of cation exchanger membranes, anion transfer in the case of anion exchanger membranes. The selective transfer of charged species is done according to an ion exchange mechanism from site to site between the ions of the solution and the counterions carried by the membrane. The selectivity mechanisms are related to the chemical nature of the materials comprising the membranes.

The electrodialysis is a purely separative method, the charged species will migrate under the effect of the electric field and will be retained in certain compartments of the device used thanks to selective membranes. The electrodialysis can also be coupled with an electrolysis method, the reactions at the electrodes, located respectively in the compartments of the tank on either side of the membrane, then being also used and the chemical species which have reacted migrate via the membrane under the effect of the electric field.

Methods using ion exchanger membranes are used for example for the desalting of sea water, the recycling of rinse waters used during metallurgical product surface treatments, the regeneration of pickling baths, the obtaining of ultrapure water or, again, the confinement of heavy metals, etc.

A disadvantage of ion exchanger membranes is that they do not allow the separation of ions with same electric charge. It is therefore impossible to selectively extract a metallic cation $A^{x+}$ in relation to another $B^{x+}$ with same charge. Also, if the transfer selectivity applies to a category, either cations or anions, it does not apply to the antagonistic ions. Also note that when the ion exchanger membranes are not submitted to an electric field, they lose all selectivity and therefore lose their sealing characteristic with regard to ions which are retained in the presence of the electric field. Also, conventional membrane methods cannot be used in the case of two media different in nature, for example, aqueous/non-aqueous. Among the other disadvantages of these membranes, we can again note their cost and their limited resistance over time.

Moreover, materials called molybdenum cluster phases or again Chevrel phases, with the general formula $Mo_6X_8$, where X can especially be S, Se, Te are also known. Molybdenum ternary chalcogenides have a variety of physical and electrochemical properties such as:
  superconductor properties at low temperature of phases with large cations;
  superconductor magnetic properties;
  mixed ionic and electronic conductivity of phases with small cations allowing these materials to be the seat of reversible intercalation/de-intercalation topotactic reactions.

These materials have already been studied for soft chemical synthesis of new materials, valorisable for their electronic, catalytical or thermoelectrical properties on the one hand or for their electrical energy storage and restitution capability on the other hand. An application resulting from this was the manufacture of rechargeable lithium batteries. By their hydrodesulphurisation catalytic activity, interest has also been shown in Chevrel phases for heterogeneous catalysis.

U.S. Pat. No. 4,917,871 and U.S. Pat. No. 5,041,347 describe the preparation and use of Chevrel phases as cathode in lithium cells. FR-2765811 concerns a hydrotreatment catalyst obtained by the forming of scattered Chevrel phases on a refractory metallic oxide. WO-0109959 describes a solar cell module based on glass fibre and Chevrel phases. WO-02/05366 describes the use of a material based on Chevrel phases including metallic filling elements, such as thermoelectric material for the production of energy. US-2005/0220699 describes an improved method for the production of Chevrel phase materials, for the manufacture of superconductor or catalyst materials. JP-2005/317289 describes a use of Chevrel phases as platinum-free catalyst or with low Pt ratio in fuel cells.

The aim of the present invention is to solve the problems posed by the use of the above-mentioned ion exchanger membranes. Its aim is to especially allow improved selective transfer of metallic ions from an aqueous or non-aqueous medium, for example an industrial liquid discharge (used electroplating baths, rinse waters, pickling baths, steel plant dust leachates, used cell leachates, slags especially from incineration plants, foundry sand and other solid wastes from the metallurgical industries) to another electrolytic medium capable of direct or indirect valorisation of the transferred metal. Its aim more generally is to allow the extraction and selective transfer of cations between aqueous and/or non-aqueous electrolytic phases.

With these targets in mind, the subject of the invention is a method for selective cation extraction by electrochemical transfer in solution from a first electrolyte to a second electrolyte characterised in that it uses as electrolyte separation wall a transfer wall made of chalcogenides with molybdenum clusters, especially the $Mo_6X_8$ phases called Chevrel phases and a transfer of cations is ensured through the said transfer wall by generating a potential difference between, on the one hand, the first electrolyte and, on the other hand, the second electrolyte or the said transfer wall in order to induce an intercalation of the cations in the transfer wall on the side of the first electrolyte, a scattering of the cations therein, and the de-intercalation thereof in the second electrolyte.

Here, the term chalcogenides with molybdenum clusters must be understood as binary or ternary materials structured from molybdenum clusters $Mo_n$ and chalcogenide networks designated X where X is S (Sulphur), Se (Selenium) or Te (Tellurium), according to the general stoichiometry $Mo_nX_{n+2}$ or $Mo_nX_n$ for the formulation of binaries and the $M_xMo_nX_{n+2}$ or $M_xMo_nX_n$ formulation for the ternary chalcogenides where M is a metal.

The invention is therefore an electrolysis method ensuring a transfer or selective transfer via a mineral junction consisting of the said transfer wall, of a cation or a set of cations, from a first electrolyte containing several cations, especially of different charges, to a recovery and/or valorisation electrolytic solution.

The principle of the process is based on the intercalation reactions of cations under a current potential or density applied to an insoluble and chemically stable solid matrix in contact with aqueous or organic media. The development of the global cation intercalation phenomenon in the matrix of the Chevrel phases, from the side of the first electrolyte, scatter in this matrix, then de-intercalation on the side of the second electrolyte, allows the transfer from one medium to the other of the predetermined mobile species, in this case the cation. The method according to the invention is especially distinguished from the membrane separation methods by the fact that it is based on the development of intercalation and de-intercalation reaction methods developing simultaneously and by electrochemical means caused by the use of the global electrolysis method between the two electrolytes.

Although the Chevrel phases have already been submitted to in-depth studies concerning some of their characteristics and for certain applications considered, as mentioned above in the presentation of the prior art, no studies have been done on the use of this type of reaction for the transfer of cations under electrochemical control, from a first electrolyte, or source electrolyte, to a second electrolyte, or recovery electrolyte, of valorisable or pollutant cations.

Unlike the separation methods using ion exchanger membranes, the method according to the invention allows selective separation between ions of same charge and different natures. The method according to the invention also allows a selective transfer of ions from a first medium, aqueous or not, to a second medium, aqueous or not, these two media being of same or different types, for example the first medium can be aqueous and the second medium organic.

Another advantage of the invention is that, apart from the products required to produce the transfer wall, no reagents are involved in the method and no waste is formed.

The cations liable to be processed according to the invention, that is capable of being engaged in intercalation/de-intercalation reactions are, for the sulphur, selenium or tellurium Chevrel phases ($Mo_6S_8$, $Mo_6Se_8$ or $Mo_6Te_8$), most "industrial" metals: Fe, Mn, Co, Ni, Cr, Cu, Zn, Cd, which may be involved in many effluent and solid waste management problems and the alkaline and alkaline-earth metals Li, Na, Mg.

The invention is based in fact on a new use of the specific properties of the Chevrel phases relevant to their cation selective transfer capability according to the oxidation-reduction characteristics of the ions present. The remarkable mobility of small cations, with an ionic radius typically lower than 0.1 nm, in mineral matrices, constructed on the $Mo_6X_8$ units of the Chevrel phases, defines reversible redox systems of type

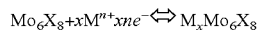

$$Mo_6X_8 + xM^{n+}xne^- \Leftrightarrow M_xMo_6X_8$$

These redox systems are diversified by the nature of the cation $M^{n+}$, the chalcogene X and the stoichiometry x of the ternary.

The intercalation of a cation M in a given matrix of a Chevrel phase (sulphur, selenium or tellurium for example) develops in a potential domain specific to the type of cation, the matrix and the chemical parameters of the electrolyte to be processed. The same applies for de-intercalation. For an intercalation selectivity between two cations M and M', the current applied must impose a working potential (by relation $E=f(i)$ of the redox system) located in the intercalation domain of the cation M avoiding passing in the domain where additional intercalation of cation M' will occur. For a current placing the working potential in the intercalation domain of the second cation, transfer of the two cations would occur with more or less total loss of selectivity. For example, in the case of a Cd—Zn mix in the first electrolyte and with a $Mo_6S_8$ transfer wall, the selective transfer of cadmium will occur if the potential of the interface between the first electrolyte and the transfer wall is maintained in the potential range from −0.450 to −0.700 V in relation to a KCl saturated calomel electrode (ECS) located in the first electrolyte. For more negative potentials, the transfer will affect the two cations. For an $Mo_6Se_8$ junction, the selectivity domain will be in the −0.300 to −0.600 V/ECS range. According to another example, for an $Mo_6S_8$ junction and in the case of an Ni—Co mix, the selective transfer of cobalt will be ensured if the potential is maintained in the −0.400 to −0.600 V/ECS range.

Although essentially advantageous by its selectivity properties during the transfer of cations, the invention also allows a global reduction of the intercalatable metals by transfer without selectivity requirements, which corresponds to an extraction by electrochemical transfer, for example for the purification treatment of an effluent, or of a retention pond. The invention also allows a concentration of the cations to be done, in a selective manner or not, by transfer of a diluted solution comprising the first electrolyte to the second electrolyte of reduced volume in comparison with the first electrolyte to obtain the sought concentration effect.

According to a specific implementation of the invention, the transfer wall is electrically connected to a potential measuring device between the said wall and reference electrodes located respectively in each electrolyte. This arrangement enables in fact a check to be conducted to ensure that the transfer process is done correctly and by adapting the electrolysis current the potential applied between the said electrolytes can be adjusted to suit.

According to another additional arrangement, direct recovery in metallic state of the cation transferred by electrodeposition can be ensured on the electrode placed in the second electrolyte. The use of a second non-aqueous electrolyte then allows for example an adapted valorisation of the cation transferred by electrodeposition of metals not achievable in an aqueous medium.

According to a variant, the potential difference is generated between the first electrolyte of the said transfer wall, and the de-intercalation on the side of the second electrolyte is a chemical de-intercalation by a chemical oxidising agent in the second electrolyte.

To improve the transfer selectivity, a succession of cation transfers can be ensured through transfer walls according to the invention, placed successively, in cascade, between the end electrolytes, and with one or more intermediary electrolytes between the various transfer walls, which can also be of different types, for example one made of $Mo_6S_8$ and the other of $Mo_6Se_8$ or $Mo_6Te_8$.

A pulsed current electrolysis, which can include cathodic and anodic pulses for the operation of the interface between transfer wall and first electrolyte, can also be ensured between the electrolytes to improve the selectivity of the intercalation reaction for a predetermined cation.

The subject of the invention is also a device for selective cation extraction by electrochemical transfer in solution, this device including a tank with at least two compartments arranged each to contain an electrolyte and separated by a sealed wall and being characterised in that the said sealed wall is comprised at least in part of at least a transfer wall made of chalcogenide with molybdenum clusters especially a mineral compound of the Chevrel phase family of $Mo_6X_8$ type where X is S, Se or Te.

According to a preferred arrangement, the said transfer wall consists of a pulverulent disc of $Mo_6X_8$ or $M_xMo_6X_8$ compacted by reactive hot pressing.

According to a specific arrangement, the transfer wall is made of $Mo_6S_8$, obtained by synthesis of a ternary $M_xMo_6S_8$ then by the de-intercalation of cation M, for example of copper, by electrochemical means.

According to an alternative arrangement, the transfer wall is made of $Mo_6Se_8$ or $Mo_6Te_8$ obtained directly by reactive hot pressing.

According to another specific arrangement, the disc will have a thickness from around 0.1 mm or even less, up to several millimeters, for example between 3 and 5 mm, a lower thickness possibly being favourable to obtain better transfer rates.

According to yet another specific arrangement, the device includes adjustable DC generation means connected between an anode placed in the first of the compartments and a cathode placed in the second compartment.

The transfer wall can also be electrically connected to a potential measuring device, connected to reference electrodes placed respectively in each compartment and the current source can be slaved according to the measured potentials.

According to additional and/or alternative arrangements:

The compartment separation wall includes a plurality of transfer walls.

The tank is separated into several successive adjacent compartments separated by identical or different transfer walls.

The first compartment includes an anode and the current generator is connected between this anode and the transfer wall.

Other features and advantages of the invention will become apparent on reading the following description of a device in compliance with the invention and its variants and several implementation examples.

The description refers to the accompanying drawings, on which:

Figure 1:
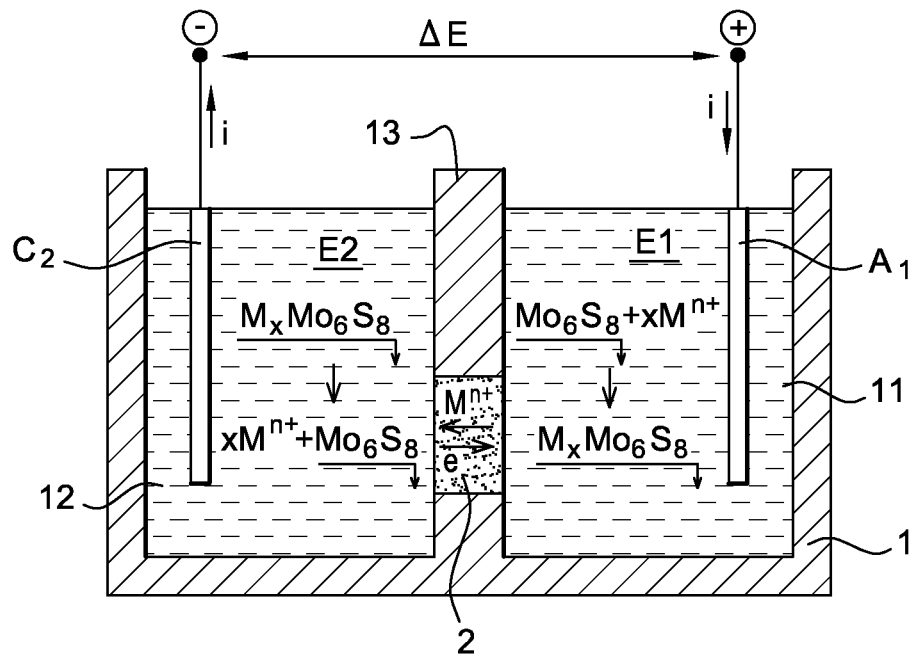
FIG. 1 is a schematic diagram of the device.

The diagram of FIG. 1 shows a tank 1 including two compartments 11 and 12, adapted to accommodate an electrolyte and separated by a separation wall 13 in which a transfer wall is placed consisting of a disc 2 installed in a sealed manner in the wall.

Figure 2:
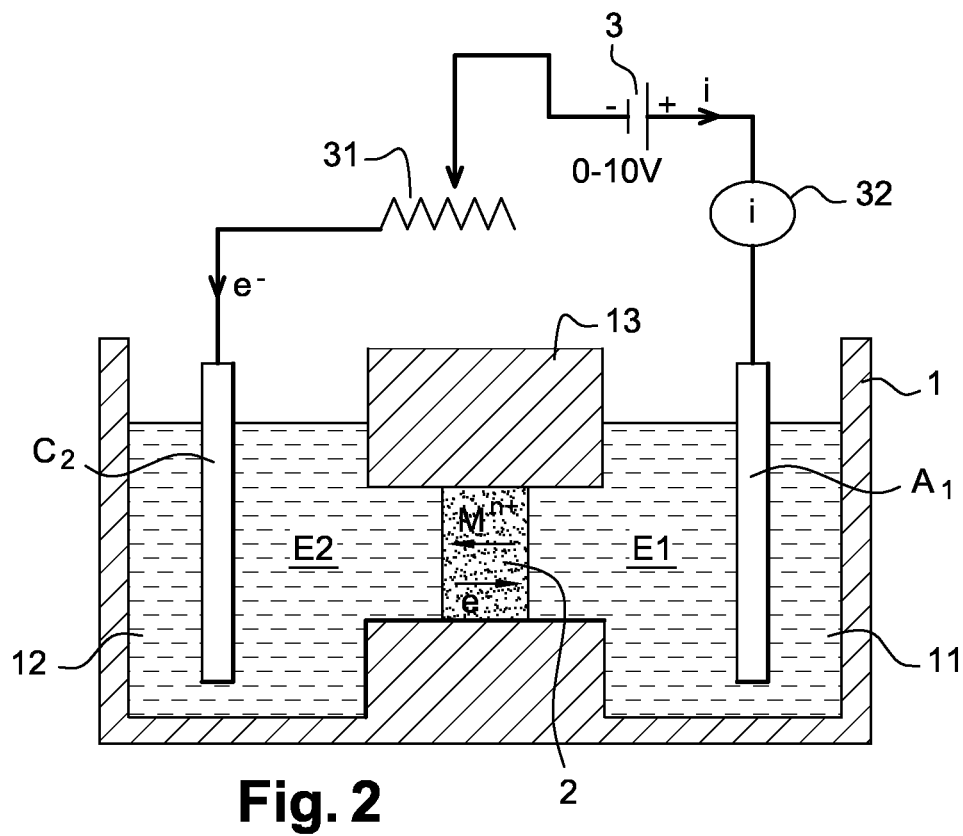
FIG. 2 is an electrical connection diagram.

The device also includes an anode A1 placed in the first compartment 11 and a cathode C2 placed in the second compartment 12. A potential difference $\Delta E$ can be applied between the anode A1 and the cathode C2, for example according to the electrical connection diagram of FIG. 2 which shows a DC source 3, supplying the two electrodes, A1 and C2, via a potentiometer 31 and a control ammeter 32.

The disc 2 is formed of a molybdenum chalcogenide, for example $Mo_6S_8$, $Mo_6Se_8$ or $Mo_6Te_8$.

The sealed discs are manufactured on the principle of a synthesis by reactive hot pressing from a mix of composition powders adapted for the stoichiometry of the material required.

During a heating to a temperature of 900 to 1200° C., the powders are compacted by imposing a pressure of 20 to 40 MPa between two graphite pistons, for example with a diameter of around 25 mm, guided in a die also made of graphite. The reactive hot pressing must lead to a compactness of the disc forming the transfer wall which is generally greater than 70% and at least adapted to allow a mobility of the cations by scattering whilst ensuring total sealing against electrolytic solutions.

The manufacturing process is different according to whether $Mo_6S_8$, $Mo_6Se_8$ or $Mo_6Te_8$ is used:

a) For $Mo_6S_8$ and because this compound is not stable at the temperatures required for the reactive hot pressing, the synthesis of this binary material cannot be done directly from elements Mo and S and passes via the synthesis of a ternary $M_xMo_6S_8$ which is stable at the temperatures required for the pressing, where M is for example copper, then by later de-intercalation of the cation $Cu^{2+}$ by electrochemical or chemical means.

The mix of powdery constituents is homogenised then placed in the graphite die. The heat is applied under argon atmosphere up to a temperature of 1000° C., held for 3 h, then return to ambient temperature. A pressure of 30 MPa is permanently applied during the heating and the temperature hold period.

In this case, the synthesis reaction during the reactive hot pressing is:

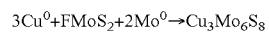

We therefore obtain a disc of this ternary material with typically the following characteristics:

| Diameter: 24.3 mm | Thickness: 4.4 mm |
|---|---|
| Theoretical density: 5.92 g/cm³ | Experimental density: 5.83 g/cm³ |

This disc can then be placed in the device. The de-intercalation of cation $Cu^{2+}$ to obtain $Mo_6S_8$ is then done by electrochemical means, by a previous utilisation of the device, before the effective use of the device for the implementation of the process.

b) For $Mo_6Se_8$, this binary compound being stable when heated, the synthesis is done directly on the binary compound from $Mo_6Se_8$ and $Mo^0$ elements.

The synthesis reaction during the reactive hot pressing is then:

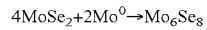

The heat is applied under argon atmosphere up to a temperature of 1200° C., held for 3 h, then return to ambient temperature. A pressure of 30 MPa is permanently applied during the heating and temperature hold period.

A disc with typically the following characteristics is obtained:

| Diameter: 24.3 mm | Thickness: 4.4 mm |
| Theoretical density: 6.69 g/cm³ | Experimental density: 6.67 g/cm³ |

Figure 3:
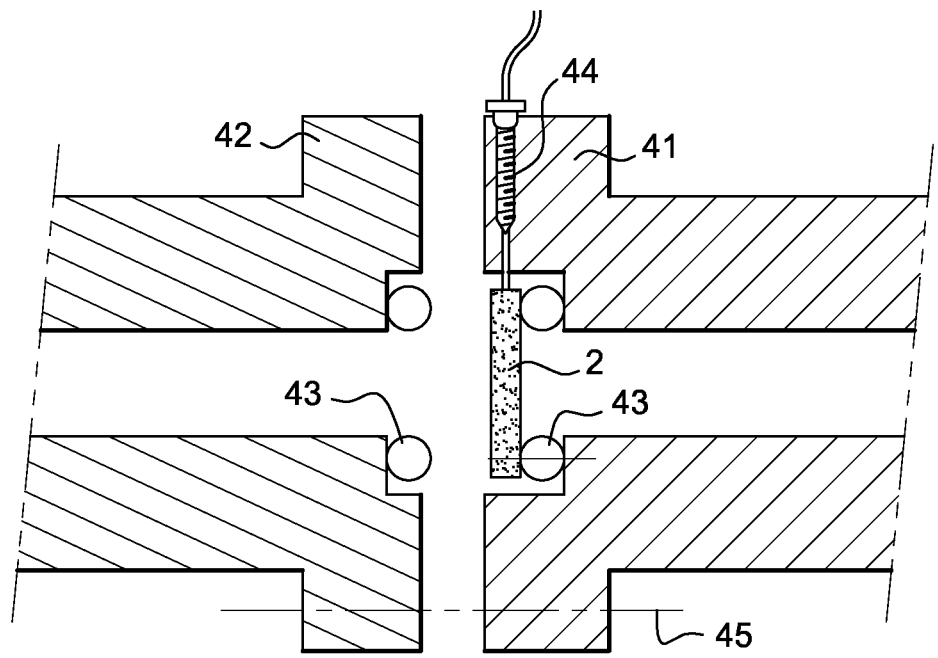
FIG. 3 is a schematic view of the installation of a disc comprising the transfer wall.
Figure 4:
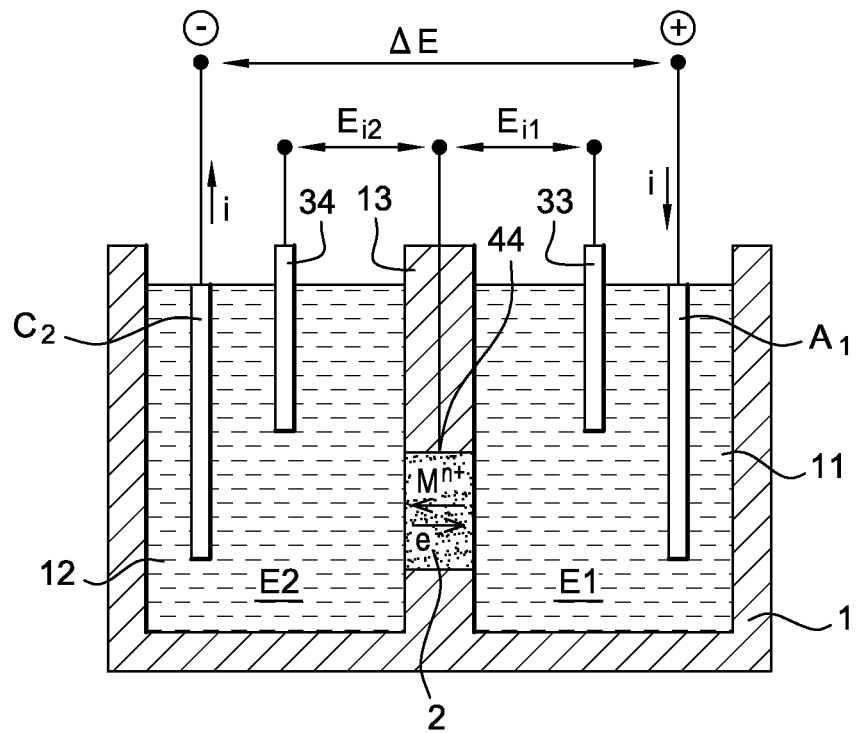
FIG. 4 is a diagram of an embodiment variant with control of the potential of the transfer wall.

In a specific embodiment mode, the $Mo_6S_8$ or $Mo_6Se_8$ disc is installed in the device as shown on FIG. 3, between two flanges 41, 42 related respectively to the compartments 11 and tightened one against the other by screws 45, the sealing being ensured by O-rings 43. A spring-mounted mobile contact system 44 ensures an electrical connection with the disc 2 and allows the disc to be connected to a control instrument adapted especially to measure the interface potential Ei1, Ei2 of the disc in relation to the reference electrodes 33, 34 placed respectively in each compartment of the tank as shown on FIG. 4.

The use of the device is typically as follows:

The compartments 11 and 12 are filled with the required electrolyte, for example, and in an in no way limitative manner, 100 ml of $NA_2SO_4$ with concentrations between 0.5 and 1 M+$M_{(i)}SO_4$ in concentrations between 0.1 and 1 M and optionally $H_2SO_4$ in concentrations between 0 and 1 M as first electrolyte E1 in the first compartment 11, and 100 ml of $Na_2SO_4$ of concentrations between 0.5 and 1 M+ optionally $H_2SO_4$ in concentrations between 0 and 1M as second electrolyte E2 in the second compartment 12, with $M_{(i)}$ being one or more metallic cations that are to be separated. The anode A1 is placed in the first compartment 11 and the cathode C2 in the second compartment 12 and the contact 44 of the disc is connected with the potentiometric control means, connected to the reference electrodes 33, 34 immersed in the electrolytes E1 and E2. The interface potentials can thus be checked and adjusted to suit the global potential ΔE applied between the anode A1 and the cathode A2 by controlling the adjustment of the potentiometer 31 to obtain a current density related to the operational surface area of the transfer wall or of all the transfer walls arranged in parallel included, for example, between 0.2 and 20 mA/cm².

An global intensiostatic state is established between the anode A1 and the cathode C2. In the global electrochemical operation of the two compartments, the electrolyte E1 being an original solution to be treated including a mix of cations of different metals and of identical or different charges, $M^{n+}$, $M'^{n+}$, $M''^{n+}$, $M'''^{n+}$ for example, and the electrolyte E2 being a valorisation solution of metal M, the following occurs as illustrated on FIG. 1:

the intercalation of the cation $M^{n+}$ at the $M_xMo_6S_8$/electrolyte E1 interface as follows:

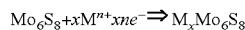

the de-intercalation of this same cation at the $M_xMo_6S_8$/electrolyte E2 interface (valorisation solution of $M^{n+}$ for example) is done vice versa as follows:

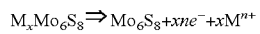

The mobility of the metallic cation in the Chevrel phase thus allows the transfer of the disolvated cation $M^{n+}$ from one medium to the other without transfer of any other chemical species from one or the other of the compartments.

As the reaction is liable to generate hydroxide ions OH⁻, the cations may precipitate. To get round this disadvantage, sulphuric acid can be used in the electrolytes E1 and E2 to keep the cations dissolved. The life of the electrolytes is thus improved.

The cations liable to be treated according to the invention, that is capable of being engaged in the intercalation/de-intercalation reactions, are for the sulphur, selenium and tellurium phases ($Mo_6S_8$, $Mo_6Se_8$ and $Mo_6Te_8$), most metals: Fe, Mn, Co, Ni, Cr, Cu, Zn, Cd which can be involved in many effluent and solid waste management problems, especially in the cell and accumulator industry, and the alkaline and alkaline-earth metals Li, Na, Mg.

The inventors were able to observe that, advantageously, and in spite of the polycrystalline character of the transfer walls, transfer faradaic yields related to the operation of the intercalation/de-intercalation redox pair (2 electrons for the transfer of a cation $M^{2+}$) and for current densities in the 1 to 10 mA/cm² range, close to 100%.

In the examples below, done from mixes of two equimolar cations (0.1 M), the selectivity of the transfer is expressed by a transfer selectivity rate of the cation $M^{n+}$ represented by the ratio $M_t^{n+}/\Sigma M_i^{n+}$ of the quantity of cations transferred $M_t^{n+}$ with the sum of cations transferred in the compartment 12, for example $Co_t/(Co_t+Ni_t)$ for $Co^{2+}+Ni^{2+}$ mix.

This ratio therefore approaches 1 as the selectivity increases.

EXAMPLE 1

Co/Ni mix=1 with $[Co^{2+}]=[Ni^{2+}]=0.1$ M
a) In $H_2O$ medium, electrolyte $Na_2SO_4$ We impose a current of 2.5 mA, that is a current density of 0.72 mA/cm² for 6 hours.

Compartment 11: Co/Ni 0.1 M
Compartment 12: $Na_2SO_4$ 0.1 M
Anode A1: platinum-plated titanium
Cathode C2: stainless steel
Transfer wall: $Mo_6S_8$ disc, 4.4 mm thick, 24.3 mm in diameter, that is a surface area of 4.63 cm² for the disc and an "active" surface area in contact with the electrolytes of 3.46 cm².

Compactness: 98.5%.

At ambient temperature and with stirring for the solution of compartment 12.

During the operation, three potentials are recorded between, respectively, the compartment 11 and the disc, the compartment 12 and the disc, and between the compartments 11 and 12, this to be able to control the electrical transfer parameters.

For this mix, a cobalt transfer selectivity ratio of 99% and a faradaic yield on the sum of the two cations of 97% was obtained.

b) The same experiment as above is conducted in $H_2O$ medium by replacing in the electrolyte $Na_2SO_4$ by $H_2SO_4$ at 0.1 M.

For this mix in acid medium and imposing a current density of 0.72 mA/cm², the selectivity ratio is 99.1% and the faradaic yield is 98.2%.

By imposing a current density of 2.16 mA/cm², the selectivity ratio is 98.7% and the faradaic yield 97.4%.

EXAMPLE 2

Cd/Zn mix=1 and $[Cd^{2+}]=[Zn^{2+}]=0.1$ M: in
a) $H_2O$ medium, electrolyte $Na_2SO_4$, we impose a current of 2.5 mA, that is a current density of 0.72 mA/cm² for 6 hours.

Compartment 11: Cd/Zn 0.1 M
Compartment 12: $Na_2SO_4$ 0.1 M
Anode: platinum-plated titanium
Cathode: stainless steel Transfer wall: $Mo_6S_8$ disc, 4.4 mm thick, diameter=24.3 mm, compactness: 98.5%.

At ambient temperature and with stirring for the solution of compartment 12.

For this mix, a cadmium transfer selectivity ratio of 97.6% and a faradaic yield of 99% was obtained.

b) The same experiment as above is conducted in $H_2O$ medium by replacing in the electrolyte $Na_2SO_4$ by $H_2SO_4$ 0.1 M. For this mix, the following were obtained
  for a current density of 0.72 $mA/cm^2$ a selectivity ratio of 97.8% and a faradaic yield of 98.1% were obtained
  for a current density of 2.16 $mA/cm^2$ a selectivity ratio of 98.2% and a faradaic yield of 98.9% were obtained.

EXAMPLE 3

Cd/Ni 0.1 M mix in aqueous medium
A current of 2.5 mA is imposed, that is a current density of 0.72 $mA/cm^2$ for 6 hours.
  Compartment 11: Cd/Ni=1 and $[Cd^{2+}]=[Ni^{2+}]$=0.1 M
  Compartment 12: $Na_2SO_4$ 0.1 M
  Anode: platinum-plated titanium
  Cathode: stainless steel
a) Transfer wall: $Mo_6S_8$ disc, thickness=4.4 mm, diameter=24.3 mm, compactness: 98.5%.

At ambient temperature and with stirring for the solution of compartment 12.

For this mix and the $Mo_6S_8$ disc, a cadmium transfer selectivity ratio of 70% and a faradaic yield of 98% were obtained.

b) Transfer wall: $Mo_6Se_8$ disc, thickness=3.4 mm, diameter=24.3 mm, compactness: 99%.

At ambient temperature and with stirring for the solution of compartment 12.

For this mix and the $Mo_6Se_8$ disc, a cadmium transfer selectivity ratio of 90% and a faradaic yield of 97% were obtained.

It thus can be seen that the method according to the invention allows a very good cation transfer selectivity to be obtained and this with a faradaic yield also very high.

Figure 5:
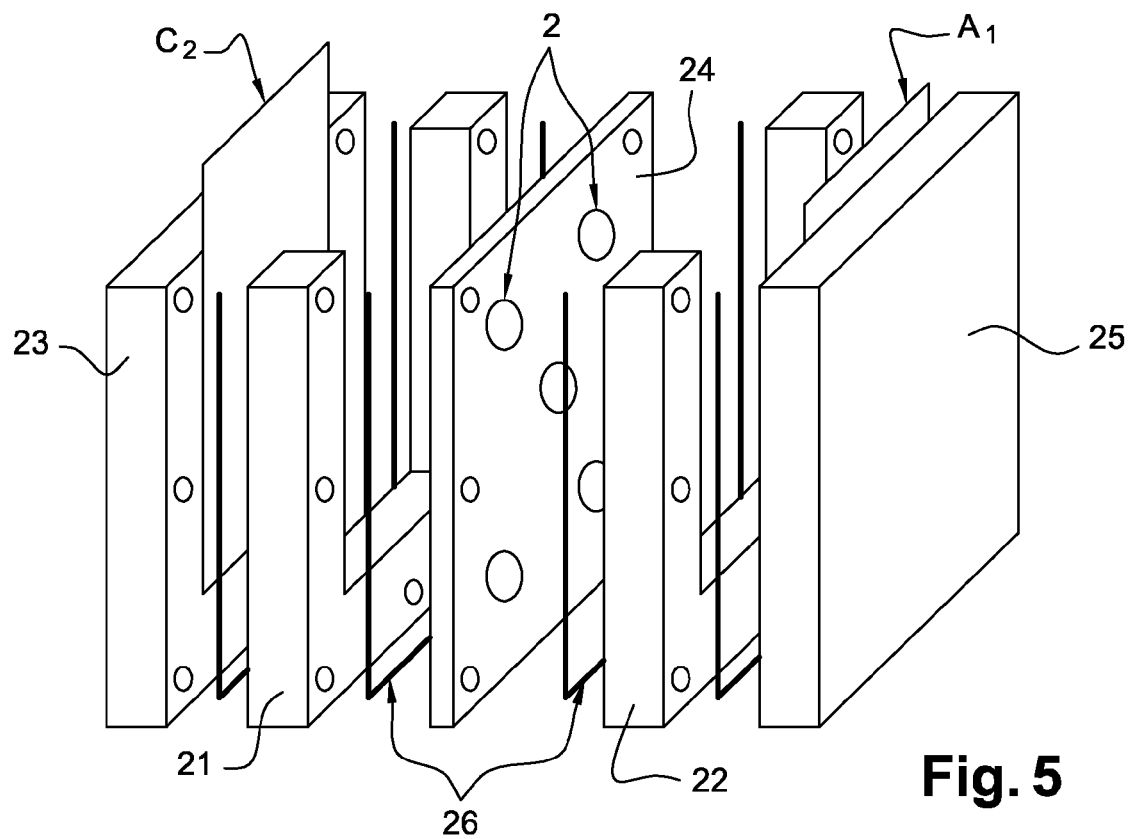
FIG. 5 shows an embodiment mode with several discs distributed in the tank compartment separation wall.
Figure 6:
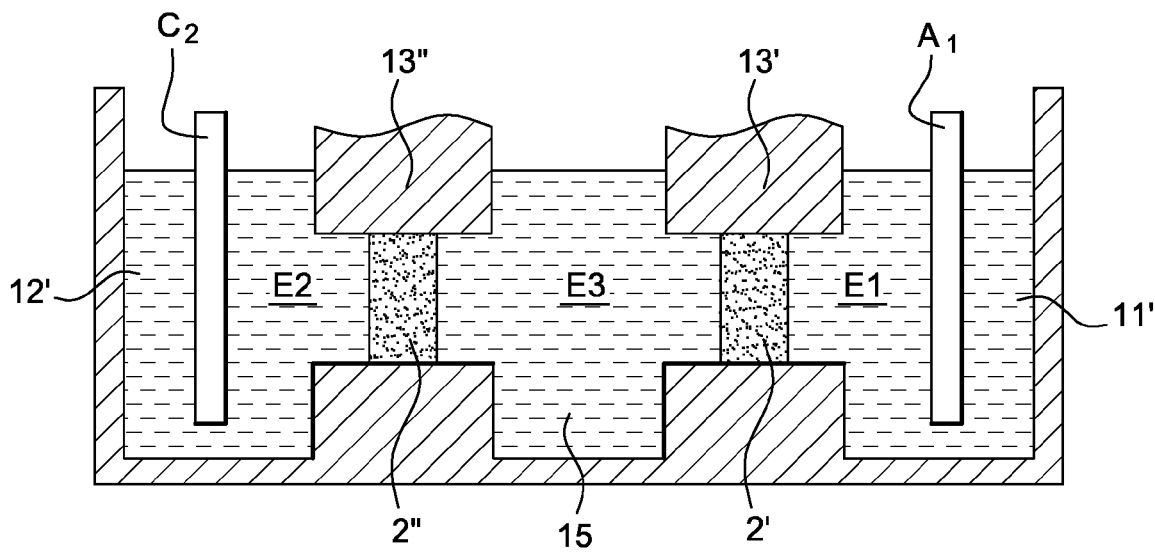
FIG. 6 shows an arrangement using several compartments and transfer walls in series.

The method can also be used according to various variants including those shown on FIGS. 5 and 6.

In the variant of FIG. 5, the tank consists of an assembly of U-shaped lateral walls 21, 22 and transverse walls 23, 24, 25 held assembled, juxtaposed and with seals 26 placed between them. The transverse walls 23 and 25 comprise the end walls of the tank. The intermediary wall 24 comprises the separation wall of the two compartments of the tank and bears a plurality of discs 2 forming the transfer walls according to the invention. Such a device allows the effective transfer surface area and therefore the global transfer rate to be increased.

In the variant of FIG. 6, the tank includes three compartments. The two end compartments 11', 12' are equivalent to the compartments 11 and 12 of the example shown on FIG. 1. An additional compartment 15, containing an electrolyte E3 is located between the two compartments 11' and 12' and separated from these by the separation walls 13', 13" each including one or more discs 2', 2" forming the transfer walls according to the invention. These discs can be of same nature, to simply increase the transfer selectivity from the compartment 11' to the compartment 12'. They can also be of different natures and be managed differently by a specific measurement of the potentials between the various compartments for example to ensure a separation of different cations. For example, two types of cations can be transferred from the compartment 11' to the compartment 15 and a single type from the compartment 15 to the compartment 12'. Various combinations of discs and of transfer parameters can thus be used to make the separations and various treatments required. The transfers can be done simultaneously on the three compartments with the same current passing through the two discs 2', 2". In another manner, the transfers can be done in steps by operating successively on two compartments, for example first 15 and 12', then 11' and 15, by adapting the location of electrodes A1 and C2.

In a general manner, it can again be seen that the electrolytes placed in the two compartments 11, 12 including the anode A1 and the cathode C2 can be different, especially by the nature of the salts, by the acidity level, by the presence of complexants, by the type of solvents, especially non-aqueous organic or mineral solvents (DMSO, DMF, ionic liquids, solid electrolytes, etc.). Thus, for example, an ionic transfer can be made from a sulphate medium to a chloride medium without scattering of the said medium.

For variants of FIG. 6, the intermediary electrolyte or electrolytes E3 can also be identical to or different from one of the two electrolytes E1 or E2.

The invention claimed is:

1. A method for selective cation extraction by electrochemical transfer in solution from a first electrolyte to a second electrolyte, comprising:
   providing a transfer wall made of chalcogenide with molybdenum clusters as an electrolyte separation wall between the first electrolyte and the second electrolyte to provide a first electrolyte side of the transfer wall and a second electrolyte side of the transfer wall; and
   generating a potential difference between the first electrolyte and the second electrolyte or the first electrolyte and the said transfer wall (2) to induce transferring of the cations by an intercalation of the cations in the transfer wall on the first electrolyte side, a scattering of the cations in the transfer wall, then the de-intercalation on the second electrolyte side.

2. The method according to claim 1, wherein the chalcogenides with molybdenum clusters are binary compounds $Mo_nX_{n+2}$ or $Mo_nX_n$ or ternary compounds $M_xMo_nX_{n+2}$ or $M_xMo_nX_n$, X being selected from the group consisting of S, Se and Te and M being a metal.

3. The method according to claim 1, wherein the first electrolyte and the second electrolyte are different.

4. The method according to claim 1, wherein at least one of the electrolytes is non-aqueous.

5. The method according to claim 1, wherein at least one of the electrolytes contains acid.

6. The method according to claim 1, wherein the transfer wall is electrically connected to a potential measuring instrument between the transfer wall and two reference electrodes each of which is located respectively in each electrolyte and the potential difference generated between the electrolytes is adjustable.

7. The method according to claim 1, wherein the potential difference is generated between the first electrolyte and the transfer wall, and the de-intercalation of the cations on the second electrolyte side is a chemical de-intercalation by a chemical oxidising agent in the second electrolyte.

8. The method according to claim 1, wherein a succession of cation transfers is ensured through a plurality of transfer walls arranged successively between the first electrolyte and the second electrolyte and one or more intermediary electrolytes between successive transfer walls.

9. An extraction device for selective cation extraction by electrochemical transfer in solution, comprising:
   a tank (1) with at least a first compartment (11) and a second compartment (12), each compartment arranged to contain an electrolyte (E1, E2) and separated by a sealed wall (13), wherein said sealed wall consists at least in part of at least one transfer wall (2) made of chalcogenide with molybdenum clusters.

10. The extraction device according to claim 9, wherein the transfer wall (2) is made of a binary $Mo_6X_8$ or a ternary $M_xMo_6X_8$ compound with X being S, Se or Te and M being a metal.

11. The extraction device according to claim 9, further comprising adjustable current generation means (3) connected between an anode (A1) placed in the first compartment (11) and a cathode (C2) placed in the second compartment (12).

12. The extraction device according to claim 9, wherein the transfer wall (2) is electrically connected to a potential measuring device connected to the reference electrodes (33, 34) each of which is placed respectively in each compartment (11, 12).

13. The extraction device according to claim 9, wherein the sealed wall (13) and includes a plurality of transfer walls (2) through which cations can be transferred.

14. The extraction device according to claim 9, wherein the tank is separated into several successive adjacent compartments (11, 12, 15) separated by sealed walls (13', 13") each of which comprises identical or different transfer walls (2', 2").

15. The extraction device according to claim 11, wherein the first compartment includes an anode (A1) and the current generation means (3) is connected between this anode and the transfer wall (2).

16. The method according to claim 1, wherein the cations transferred are from one or more metals selected from the group consisting: Fe, Mn, Co, Ni, Cr, Cu, Zn, Cd, Li, Na, and Mg.

17. The method according to claim 1, further comprising recovering the cations from a metal or metals transferred in the second electrolyte.

18. The method according to claim 1, wherein the method provides the purification of the first electrolyte.

19. The method according to claim 1, wherein the method provides the concentration of a cation solution by transfer of cations from a diluted solution comprising the first electrolyte to the second electrolyte with a reduced volume in relation to the first electrolyte.

20. The method according to claim 1, further comprising electrodepositing on the electrode placed in the second electrolyte to directly recover in metallic state of the transferred cation.

\* \* \* \* \*

UNITED STATES PATENT AND TRADEMARK OFFICE
CERTIFICATE OF CORRECTION

PATENT NO. : 8,449,747 B2  Page 1 of 1
APPLICATION NO. : 12/666372
DATED : May 28, 2013
INVENTOR(S) : Boulanger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 695 days.

Signed and Sealed this
Eighth Day of September, 2015

Michelle K. Lee
*Director of the United States Patent and Trademark Office*